United States Patent
Otsuka (10) Patent No.: US 7,471,662 B2
(45) Date of Patent: Dec. 30, 2008

(54) RADIO STATION AND OUTPUT PREVENTION METHOD

(75) Inventor: Naoki Otsuka, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 507 days.

(21) Appl. No.: 10/923,942

(22) Filed: Aug. 24, 2004

(65) Prior Publication Data

US 2005/0047385 A1   Mar. 3, 2005

(30) Foreign Application Priority Data

Aug. 27, 2003   (JP) .............................. 2003-303321

(51) Int. Cl.
*H04M 3/16* (2006.01)
*H04Q 7/24* (2006.01)
(52) U.S. Cl. ..................... 370/338; 455/41.2; 455/41.3; 455/410; 455/411
(58) Field of Classification Search ................ 455/41.2, 455/68, 41.1, 41.3, 410, 411; 370/338, 245, 370/278
See application file for complete search history.

(56) References Cited

U.S. PATENT DOCUMENTS

| | | | | |
|---|---|---|---|---|
| 6,496,930 | B1 * | 12/2002 | Ono et al. ................... | 713/168 |
| 7,171,157 | B2 * | 1/2007 | Lee ................................ | 455/8 |
| 7,174,157 | B2 * | 2/2007 | Gassho et al. ............... | 455/410 |
| 7,215,677 | B2 * | 5/2007 | Lung ............................. | 370/400 |
| 7,277,547 | B1 * | 10/2007 | Delker et al. ................ | 380/270 |
| 7,336,926 | B2 * | 2/2008 | Noda et al. .................. | 455/41.2 |
| 2003/0092395 | A1 | 5/2003 | Gassho et al. | |
| 2004/0249977 | A1 * | 12/2004 | Minamisawa ................ | 709/245 |
| 2005/0050318 | A1 * | 3/2005 | Alone et al. .................. | 713/155 |
| 2005/0272371 | A1 * | 12/2005 | Komatsuzaki et al. ....... | 455/41.2 |

FOREIGN PATENT DOCUMENTS

| | | | |
|---|---|---|---|
| EP | 1 102 454 A1 * | 5/2001 | |
| JP | A 2003-152735 | 5/2003 | |

OTHER PUBLICATIONS

Toru Miyahara, "LAN Construction for Beginners, 4th Advice On Wireless LAN," Network Magazine, Kabushiki Kaishi Aski, vol. 8, No. 5, pp. 112-115, May 1, 2003.
Kotowari Nakamichi et al., "Secure Wireless LAN Devices Based On Complete Survey On 40 Products," Nikkei Byte, Nikkei BP, No. 237, pp. 72-87, Jan. 22, 2003.

* cited by examiner

*Primary Examiner*—George Eng
*Assistant Examiner*—Brandon J Miller
(74) *Attorney, Agent, or Firm*—Oliff & Berridge, PLC (57) ABSTRACT

A radio station, which conducts radio communications with an access point configuring a part of a wireless LAN, has a setting information acquisition section that acquires setting information as to whether or not the access point is set so as not to output connection data for conducting radio communications, a determination section that determines whether or not the access point is set so as not to output the connection data based on the setting information acquired by the setting information acquisition section, and an output prevention section that prevents a part or all of the connection data set or acquired in conducting radio communications with the access point from being outputted to the outside of the radio station if the determination section determines that the access point is set so as not to output the connection data.

23 Claims, 5 Drawing Sheets

RADIO STATION AND OUTPUT PREVENTION METHOD

BACKGROUND OF THE INVENTION

1. Field of the Invention

The invention relates to a radio station which conducts radio communications in accordance with wireless LAN standard and an output prevention method which can be used in the radio station.

2. Description of the Related Art

Nowadays, a wireless LAN for realizing data communications by radio between stations or between a station and an external network becomes widely available.

Generally, a network of a wireless LAN is configured together with not only stations, but also access points each for playing a roll for relaying station-to-station radio communications and relaying radio communications between a station and an external network.

In each station in the wireless LAN, the same SSID (Service Set IDentifier or ESSID (Extended SSID)) as the SSID assigned to the access point is set as the connection data for conducting radio communications and the access point is determined, whereby it is made possible to access the access point. Since only the station in which the same SSID as that assigned to the access point is set has access to the access point (except for an exception), the SSID is also set from the aspect for use as an authentication function for connecting to the wireless LAN.

However, the following are defined for the access point according to the wireless LAN standard (IEEE 802.11): A beacon signal is transmitted for sending the SSID assigned to the access point to the surrounding stations at regular time intervals and upon reception of an inquiry request (probe request) from a station with the SSID set to "ANY," a reply including the SSID of the access point (probe response) is returned. Since the SSID assigned to the access point can be determined from the beacon signal or the probe response, if the SSID is used as the authentication function, adequate security of the network cannot be provided; this is a problem.

Thus, in recent years, an access point of the specifications in which the SSID (connection data) is closed to the public (is not output) in such a manner that the SSID is not included in the beacon signal and that a reply not including the SSID of the access point is sent (or no reply is sent) in response to a connection request with the SSID set to "ANY" has been commercially available.

Such specifications would prevent the access point from transmitting the signal including the SSID (beacon signal, probe response) carelessly, so that the security of the network can be enhanced.

By the way, when various settings including the SSID (for example, WEP (Wired Equivalent Privacy) key, etc.,) are made in the station, if the station is provided with an easy-to-use user interface like a personal computer (PC), the user can easily make settings through the user interface.

However, with the station having no easy-to-use user interface as compared with the PC, such as a printer or a scanner, it is difficult for the user to make settings through the user interface. Some stations do not allow the user to make settings through a user interface. In most of such stations, data concerning settings is transferred to and from a different station, whereby the station is indirectly set (remotely set up) from the different station.

To thus transfer data to and from a different station, it is a common practice to conduct data communications by radio although data can also be transferred by data communications via a cable. However, at the time, it is feared that the SSID assigned to the access point may be determined from the data transferred to and from the different station by radio, and it is also feared that the radio data transfer may cause the security of the network to be degraded.

Proposed as an art for preventing degradation of the security caused by the radio data transfer is, for example, an art of transferring the data concerning the settings required for accomplishing data communications through an access point (set parameters) by a radio wave weaker than the usual radio wave between the station and the access point. (Refer to JP-A-2003-152735.) Accordingly, the reception zone of the data can be narrowed, so that the security of the network can be enhanced.

JP-A-2003-152735 is referred to as a related art.

As described above, in the wireless LAN, hitherto, various arts for enhancing the security of the network have been become commercially available and proposed. However, they are arts only for enhancing the security in the access point.

In the station in which the SSID of the access point is set, the SSID of the access point is recorded in memory, etc., of course, and therefore the possibility that a malicious user will know the SSID recorded in the station still remains.

As a specific example, the SSID of the access point to be accessed from the station is displayed on a display section of the station, whereby the SSID of the access point can be easily known. If the station has a network management function (SNMP (Simple Network Management Protocol) agent), it is also possible to send the SSID in response to an information request from a network management tool (SNMP manager).

Thus, in the wireless LAN, the security measures in the station are not sufficient as compared with those in the access point.

SUMMARY OF THE INVENTION

The object of the invention is to provide a radio station and an output prevention method which enhance security of a station in a wireless LAN.

The invention provides a radio station which conducts radio communications with an access point configuring a part of a wireless LAN, having a setting information acquisition section, a determination section, and an output prevention section. The setting information acquisition section acquires setting information as to whether or not the access point is set so as not to output connection data for conducting radio communications. The determination section determines whether or not the access point is set so as not to output the connection data based on the setting information acquired by the setting information acquisition section. The output prevention section prevents a part or all of the connection data set or acquired in conducting radio communications with the access point from being outputted to the outside of the radio station if the determination section determines that the access point is set so as not to output the connection data.

The invention also provides an output prevention method of preventing a radio station which conducts radio communications with an access point configuring a part of a wireless LAN from outputting a part or all of connection data used to conduct radio communications with the access point to the outside of the radio station, including the steps of: acquiring setting information as to whether or not the access point is set so as not to output the connection data; determining whether or not the access point is set so as not to output the connection data based on the acquired setting information; and preventing a part or all of the connection data set or acquired in conducting radio communications with the access point from being outputted to the outside of the radio station if the access point is determined to be set so as not to output the connection data.

Therefore, it can prevent the access point set so as not to output the connection data from outputting a part or all of the connection data set or acquired in conducting radio communications with the access point to the outside of the radio station. Outputting the connection data to the outside of the radio station is thus prevented, so that a malicious user can be prevented from knowing the connection data of the access point set so as not to output the connection data.

DETAILED DESCRIPTION OF THE PREFERRED EMBODIMENTS

As the best mode for carrying out the invention, a network 1 including a plurality of network devices (simply, devices) connected as a local area network (LAN) will be discussed by way of example.

First Embodiment

Figure 1:
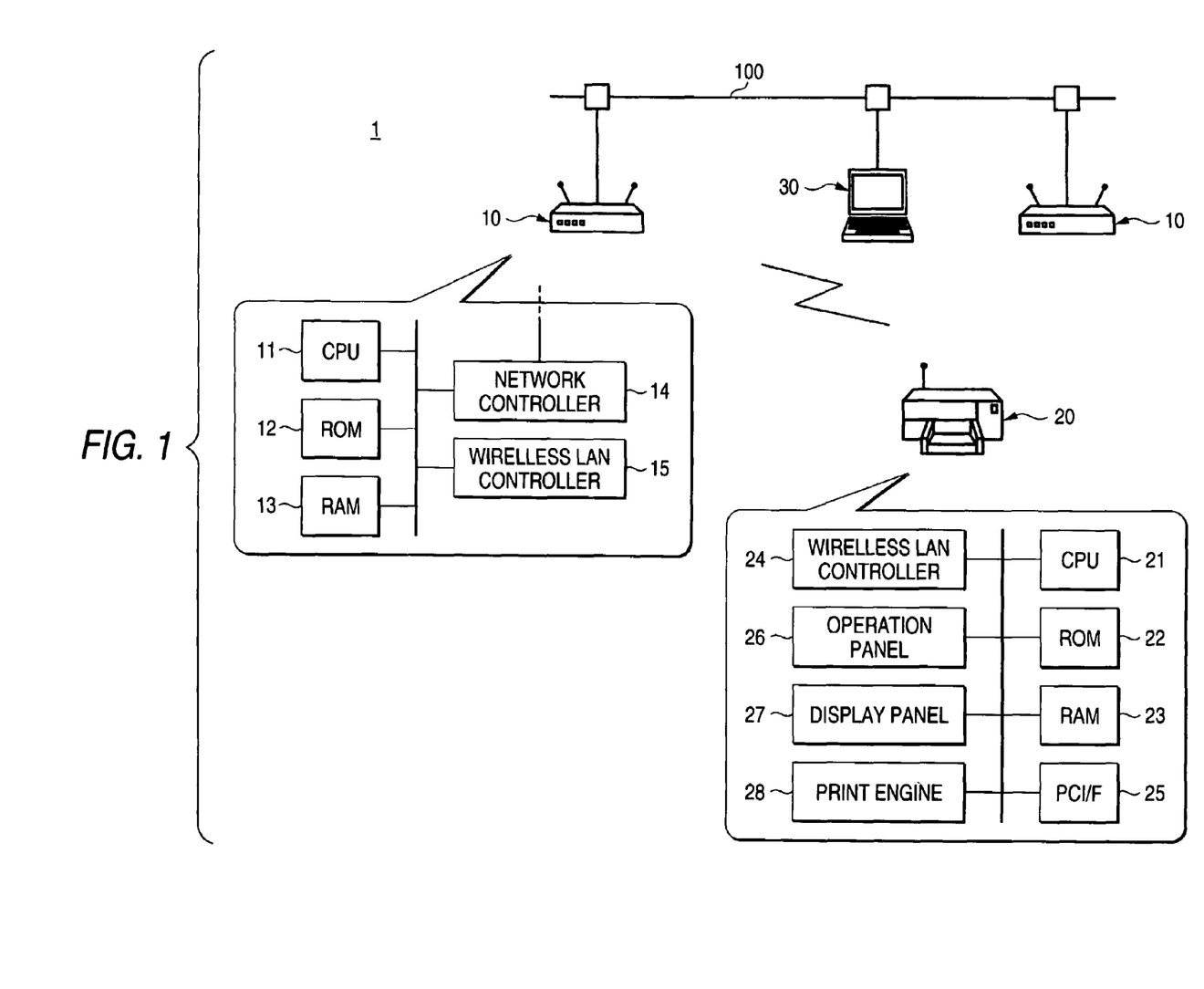
FIG. 1 is a drawing to show a network made up of devices.

The network 1 is made up of access points 10, a network printer (simply, printer) 20, a personal computer (PC) 30, etc., as shown in FIG. 1.

First, the access point 10 is a repeater for relaying data communications between a radio station that can conduct radio communications with the access point 10 and a different device connected via a cable 100; it includes a CPU 11, ROM 12, RAM 13, a network controller 14, a wireless LAN controller 15, etc.

The CPU 11 of the access point 10 controls the whole operation of the access point 10 by sending a command to each component while recording the processing result in the RAM 13 according to a processing procedure recorded in the ROM 12.

The RAM 13 records parameter data capable of determining parameters required for the access point 10 to conduct radio communications with a radio station, function data indicating whether or not an SSID secret function (described later) is to be used, and the like. The parameter data is data capable of determining the SSID (service set identifier or ESSID (extended SSID)) assigned to the access point 10, etc. The access point 10 permits access only from the radio station in which the same SSID as the SSID assigned to the access point 10 is set (except for an exception). The parameter data and the function data are data generated as data concerning settings is transferred to and from a different device by radio or cable and indirect settings (remote setup) are made from the different device.

The network controller 14 is an interface for realizing data communications with a different device connected via the cable 100. The wireless LAN controller 15 is an interface for realizing radio communications with a radio station.

The "SSID secret function" indicated by the function data described above will be discussed. The SSID secret function is a function to suppress carelessly sending the SSID to the surrounding radio stations by the access point 10, and is made up the following two functions: Function 1: Not to include the SSID in a beacon signal.

The wireless LAN standard (IEEE 802.11) stipulates that the device used as an access point transmits a beacon signal for sending the SSID assigned to the device to the surrounding radio stations at regular time intervals. Since the SSID of the access point 10 can be determined from the beacon signal, the SSID is not included in the beacon signal to suppress sending the SSID to the surrounding radio stations. Function 2: Not to send a reply to a connection request from the radio station with the SSID set to "ANY" (or to send a reply not including the SSID).

The wireless LAN standard stipulates that upon reception of a connection request (probe request) from the radio station with the SSID set to "ANY," the device used as an access point sends a reply (probe response) including the SSID of the device. Since the SSID of the access point 10 can be determined from the reply like the beacon signal described above, the reply is not sent (or a reply not including the SSID is sent) to suppress sending the SSID to the surrounding radio stations.

The wireless LAN standard stipulates that the device used as an access point unconditionally permits access from the radio station with the SSID set to blank (no SSID entered) or "ANY," which is "exception" when the access point 10 permits access from radio stations. In the SSID secret function, the function not to permit access from the radio station with the SSID set to blank or "ANY" can also be provided.

Next, the printer 20 is a device functioning as a radio station; it includes a CPU 21, ROM 22, RAM 23, a wireless LAN controller 24, a PC interface section (PC I/F) 25, an operation panel 26, a display panel 27, a print engine 28, etc.

The CPU 21 of the printer 20 controls the whole operation of the printer 20 by sending a command to each component while recording the processing result in the RAM 23 according to a processing procedure recorded in the ROM 22.

The RAM 23 records parameter data indicating the settings for the printer 20 to conduct radio communications with the access point 10 and the like. The parameter data is data indicating the SSID assigned to the access point 10 to relay data communications by the printer 20, etc. The printer 20 is permitted to access only the access point 10 assigned the same SSID as the SSID. Like the parameter data in the access point 10, the parameter data is data generated as data concerning settings is transferred to and from a different device by radio or cable and indirect settings are made from the different device.

The wireless LAN controller 24 is an interface for realizing radio communications with the access point 10.

The PC interface section 25 is an interface for connecting the printer 20 to a PC via communication cable. Data communications between the printer 20 and the PC are made possible through the PC interface section 25.

Further, application software for causing the printer 20 to function as an SNMP (Simple Network Management Protocol) agent is built in the printer 20. Upon reception of an SNMP request command to request a predetermined parameter through the network 1, the function of the SNMP agent enables the printer 20 to return an SNMP response command including the parameter requested in the SNMP request command. The parameter requested in the SNMP request command is read from a database recorded in the RAM 14 (MIB (Management Information Base)). Various parameters concerning the printer 20 are registered in the database; when the above-described parameter data is generated or updated, the data indicated by the parameter data, namely, the SSID assigned to the access point 10 for relaying data communications is registered in the database.

The PC 30 is a known computer system that, can be connected to the network 1 via the cable 100. Application software for causing the PC 30 to function as an SNMP manager is built in the PC 30. The function of the SNMP manager enables the CPU 30 to transmit an SNMP request command for requesting a predetermined parameter to a different device and receive and collect an SNMP response command returned from the device receiving the SNMP request command.

<Table Registration Processing of Printer 20>

A processing procedure of table registration processing executed by the CPU 21 of the printer 20 will be discussed with FIG. 2. The table registration processing is repeatedly executed every given time (in the embodiment, every 30 sec) after the printer 20 is started.

First, an AP (access point) table is initialized (s110). At s110, all items (SSIDs) registered in the AP table of the data table recorded in the RAM 23 in the previously executed table registration processing are deleted. If the table registration processing is executed first after the printer 20 is started, an AP table with no data registered therein is generated in the RAM 23.

Next, a timer is set (s120). At s120, counting down is started at a predetermined value (in the embodiment, 2 sec).

Next, whether or not the timer expires is checked (s130).

If the timer does not expire (NO at s130), whether or not a beacon signal is received is checked (s140). The beacon signal is a signal transmitted every given time (for example, every 100 msec) from each access point existing in the periphery (within the radio reception zone) of the printer 20. If the access point transmitting the beacon signal is not set to use of the SSID secret function, it transmits the beacon signal in a state in which the SSID assigned to the access point can be determined; if the access point is set to use of the SSID secret function, it transmits the beacon signal in a state in which the SSID cannot be determined.

If no beacon signal is received (NO at s140), the process returns to s130. On the other hand, if a beacon signal is received (YES at s140), whether or not the SSID can be determined from the beacon signal is checked (s150).

If the SSID cannot be determined from the beacon signal (NO at s150), the process returns to s13O. On the other hand, if the SSID can be determined (YES at s15O), whether or not the SSID is already registered in the AP table is checked (s160).

If the SSID is already registered in the AP table (YES at s160), the process returns to s130. On the other hand, if the SSID is not yet registered (NO at s160), the SSID is registered in the AP table (s170). The SSID registered in the AP table is the SSID assigned to the access point set to no use of the SSID secret function.

After s170 terminates, the process returns to s130.

After s130 to s170 are thus repeated until the timer expires, if the timer expires at s130 (YES at s130), the table registration processing is terminated.

As s130 to s170 are thus repeated, the SSIDs of the access points 10 set to no use of the SSID secret function among the access points 10 existing in the periphery of the printer 20 are registered in the AP table.

<Operation Processing of Printer 20>

A processing procedure of operation processing executed by the CPU 21 of the printer 20 will be discussed with FIG. 3. The operation processing is repeatedly executed each time the user operates the operation panel 26 after the printer 20 is started. In the printer 20, the user can operate the operation panel 26 not only to make various settings in the printer 20, but also to display the SSID assigned to the access point 10 for relaying data communications by the printer 20 on the display panel 27 to check the setting (SSID display operation).

First, the CPU 21 waits until the user operates the operation panel 26 (NO at s202).

If the user operates the operation panel 26 (YES at s202), whether or not the user operation is SSID display operation is checked (s204).

If the user operation is not SSID display operation (NO at s204), processing responsive to the user operation (miscellaneous processing) is performed (s206) and then the process returns to s202.

On the other hand, if the user operation is SSID display operation (YES at s204), whether or not the SSID assigned to the access point 10 for relaying data communications is registered in the AP table is checked (s210). At s210, whether or not the SSID assigned to the access point 10 for relaying data communications by the printer 20, namely, the SSID indicated by the parameter data recorded in the RAM 23 is registered in the AP table is checked, whereby whether or not the access point 10 is set to use of the SSID secret function is checked.

If the SSID is registered in the AP table (YES at s210), the SSID is displayed on the display panel 27 (s220) and then the process returns to s202.

On the other hand, if the SSID is not registered in the AP table (NO at s210), a character string, etc., is displayed on the display panel 27 in a state in which the SSID cannot be identified (s230) and then the process returns to s202. In the embodiment, a character string consisting of as many asterisks "*" as the number of characters making up the SSID is displayed on the display panel 27 for setting the "state in which the SSID cannot be identified." However, an unrelated character string, a message to the effect that the access point is set to no use of the SSID secret function, a state in which nothing is displayed, etc., may be adopted as the "state in which the SSID cannot be identified."

<SNMP Agent Processing of Printer 20>

A processing procedure of SNMP agent processing executed by the CPU 21 of the printer 20 will be discussed with FIG. 4. The SNMP agent processing is processing executed by the SNMP agent function.

First, the CPU 21 waits until an SNMP request command is received from the PC 30 through the network 1 (NO at s302).

If an SNMP request command is received (YES at s302), whether or not the parameter requested in the SNMP request command is the SSID assigned to the access point 10 for relaying data communications by the printer 20 is checked (s304). At s304, if the parameter requested in the SNMP request command matches the SSID indicated by the parameter data recorded in the RAM 23, it is determined that the parameter requested in the SNMP request command is the SSID assigned to the access point 10 for relaying data communications by the printer 20.

If the parameter is not the SSID (NO at s304), the parameter is read from the database (s306).

On the other hand, if the parameter is the SSID (YES at s304), whether or not the SSID assigned to the access point 10 for relaying data communications is registered in the AP table is checked (s310). At s310, whether or not the SSID assigned to the access point 10 for relaying data communications by the printer 20, namely, the SSID indicated by the parameter data recorded in the RAM 23 is registered in the AP table is checked, whereby whether or not the access point 10 is set to use of the SSID secret function is checked.

If the SSID is registered in the AP table (YES at s310), the SSID registered in the database is read (s320).

On the other hand, if the SSID is not registered in the AP table (NO at s310), the SSID registered in the database is read and a character string that cannot be identified as the SSID is generated (s330). In the embodiment, a character string consisting of as many asterisks "*" as the number of characters making up the SSID is generated as the "character string that cannot be identified as the SSID." However, an unrelated character string, a message to the effect that the access point is set to no use of the SSID secret function, etc., may be adopted as the "character string that cannot be identified as the SSID."

An SNMP response command is returned to the PC 30 (s308). At s308, if the parameter or the SSID is read at s306 or s320, an SNMP response command including the parameter or the SSID is returned to the PC 30. If a character string is generated at s330, an SNMP response command including the character string is returned to the PC 30.

After s308 thus terminates, the process returns to s302.

Advantages of the First Embodiment

According to the printer 20 configuring a part of the network 1 described above, for the access point 10 set to use of the SSID secret function, namely, set so that the SSID is not sent (not opened to the public) to the surroundings, outputting the SSID set in conducting radio communications with the access point 10 to the outside of the printer 20 can be prevented. Since outputting the SSID to the outside of the printer 20 can be thus prevented, a malicious user can be prevented from knowing the SSID of the access point 10 set so that the SSID is not sent (not opened to the public) to the surroundings.

Specifically, in the operation processing previously described with reference to FIG. 3, when the user operates the operation panel 26 to display on the display panel 27 the SSID assigned to the access point 10 for relaying data communications by the printer 20, the SSID corresponding to the operation is the SSID of the access point 10 set to use of the SSID secret function (s210), a character string, etc., is displayed on the display panel 27 in a state in which the SSID cannot be identified (s230). Accordingly, the SSID assigned to the access point 10 for relaying data communications can be prevented from being displayed on the display panel 27 as it is, namely, can be prevented from being known.

In the SNMP agent processing previously described with reference to FIG. 4, when the printer 20 receives an SNMP request command to request the SSID of the access point 10 for relaying data communications, if the SSID requested in the SNMP request command is the SSID of the access point 10 set to use of the SSID secret function (s310), a character string that cannot be identified as the SSID is returned as an SNMP response command (s308). Accordingly, the SSID can be prevented from being known because an SNMP response command including a character string that cannot be identified as the SSID is returned in response to the SNMP request command.

In the table registration processing previously described with reference to FIG. 2, the SSID of the access point 10 set to use of the SSID secret function can be registered in the AP table based on a beacon signal transmitted from the access point 10 at regular time intervals. In the operation processing in FIG. 3 and the SNMP agent processing in FIG. 4, whether or not the access point is an access point set to use of the SSID secret function can be determined based on the AP table (s210, s310).

Figure 2:
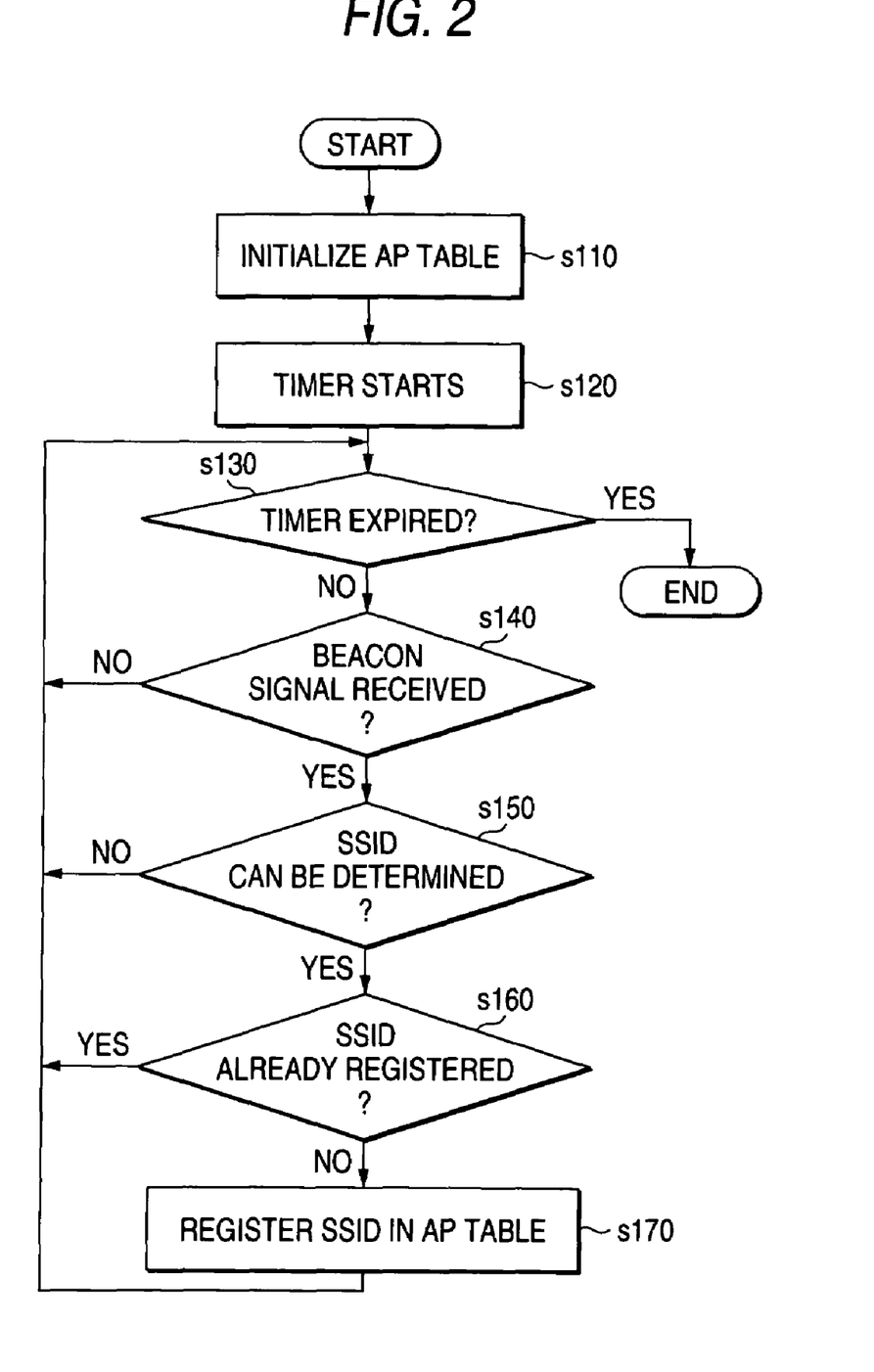
FIG. 2 is a flowchart to show a processing procedure of table registration processing in a first embodiment of the invention.

In the table registration processing in FIG. 2, to acquire the SSID at s130 to s170, the AP table is initialized at s110 and newly acquired SSIDs only are registered in the AP table.

Thus, for example, if the access point having the SSID registered in the AP table in the table registration processing executed in the past, namely, the access point 10 set to no use of the SSID secret function is changed to setting of use of the SSID secret function, only the SSIDs complying with the most recent setting can be registered in the AP table. Accordingly, accidental outputting the connection data as whether or not the access point 10 is set to no use of the SSID secret function is erroneously determined at s210 in FIG. 3 or s310 in FIG. 4 can be prevented.

When the table registration processing in FIG. 2 is executed, for example, if it is made impossible to normally receive a beacon signal capable of determining the SSID from the access point 10 because of trouble such that the access point 10 is placed temporarily out of the reception zone of the electric field or operates unstably, the SSID is not registered in the AP table. Thus, even if the access point 10 is an access point set to no use of the SSID secret function in the past, the access point 10 is determined an access point set to use of the SSID secret function.

While it is made impossible to normally determine the SSID because of trouble in the access point 10, it is also possible that setting is changed to setting of use of the SSID secret function in the access point 10. Thus, even if such an access point 10 is an access point set to no use of the SSID secret function in the past, it is risky to determine that the access point is determined an access point set to no use of the SSID secret function.

Thus, if it is made impossible to receive a normal beacon signal (determine the SSID) from the access point 10 because of trouble in the access point 10, the access point 10 can be determined the access point 10 set to use of the SSID secret function, which is suited for preventing accidental opening the SSID to the public.

Second Embodiment

A network 1 in a second embodiment of the invention has a similar configuration to that of the network 1 in the first embodiment. They differ only in processing procedure of table registration processing executed by printer 20 and therefore only the table registration processing will be discussed in detail.

<Table Registration Processing of Printer 20>

Figure 5:
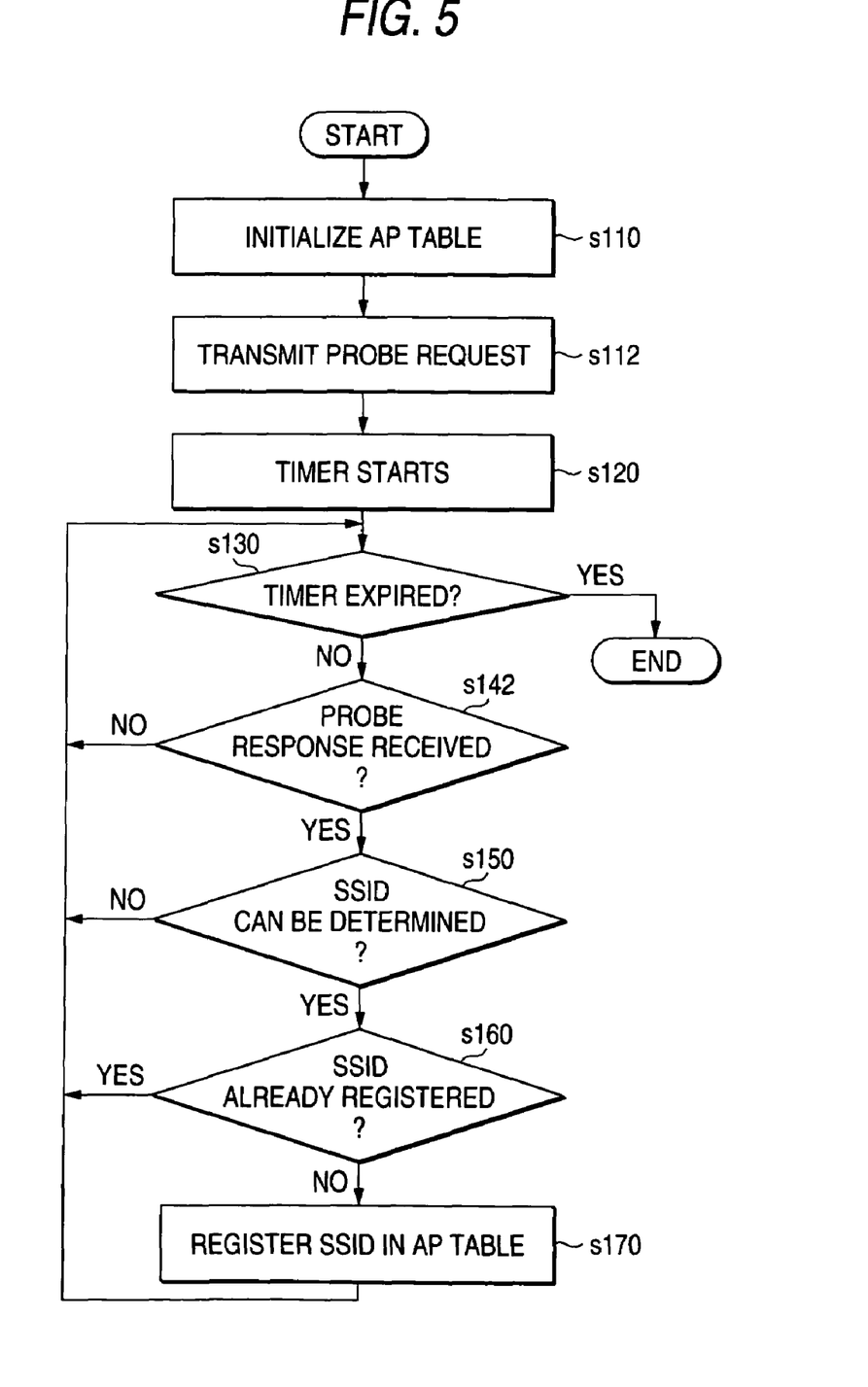
FIG. 5 is a flowchart to show a processing procedure of table registration processing in a second embodiment of the invention.

In the table registration processing in the first embodiment (FIG. 2), the SSID determined based on a beacon signal is registered in the AP table; while, in the table registration processing in the second embodiment, the SSID determined based on a probe response is registered in an AP table. Only the difference will be discussed in detail.

First, as shown in FIG. 5, a probe request with the SSID set to "ANY" is transmitted (s112) between s110 and s120. From the access point 10 receiving the probe request, a probe response including the SSID is returned if the access point 10 is set to no use of the SSID secret function. On the other hand, if the access point 10 is set to use of the SSID secret function, no probe response is returned or a probe response including no SSID is returned.

If a timer does not expire (NO at s130), whether or not a probe response is received is checked (s142).

If no probe response is received (NO at s142), the process returns to s130. On the other hand, if a probe response is received (YES at s142), whether or not the SSID can be determined from the probe response is checked (s150).

If the SSID cannot be determined from the probe response (NO at s150), the process returns to s130. On the other hand, if the SSID can be determined (YES at s150), s160 and the later steps are executed.

Advantages of the Second Embodiment

According to the printer 20 configuring a part of the network 1 described above, the following advantage can be provided in addition to the advantages provided according to the printer 20 in the first embodiment:

According to the printer 20 in the second embodiment, the SSID of the access point 10 set to use of the SSID secret function can be registered in the AP table based on the probe response returned from the access point 10 in table registration processing in FIG. 5.

[Modifications]

Although the invention has been described based on the embodiments, it is to be understood that the invention is not limited to the specific embodiments thereof and can be embodied in various forms.

For example, in the embodiment, the radio station of the invention is applied to the network printer by way of example. However, the configuration of the invention can also be applied to any device other than the network printer if the device functions as a radio station. For example, a scanner including a read section in place of the print engine 28, a digital camera, a printer, or a multifunction processing machine or a FAX including the functions as them or the like is possible.

In the embodiment, the processing previously described with reference to each flowchart is executed by the computer system including the CPU 21 of the printer 20 by way of example. However, a part or all of the processing may be executed by another computer system connected to the printer 20 by a wired or radio signal transmission line.

In the embodiment, when the SSID can be determined at s150 to s170 in FIG. 2 or FIG. 5, the SSID is recorded; however, information obtained from the received beacon signal or probe response (for example, the MAC address of the access point, etc., in addition to the SSID) may be recorded in a general way. In this case, the information including the SSID is retrieved from the AP table at s210 in FIG. 3 or s310 in FIG. 4.

Figure 3:
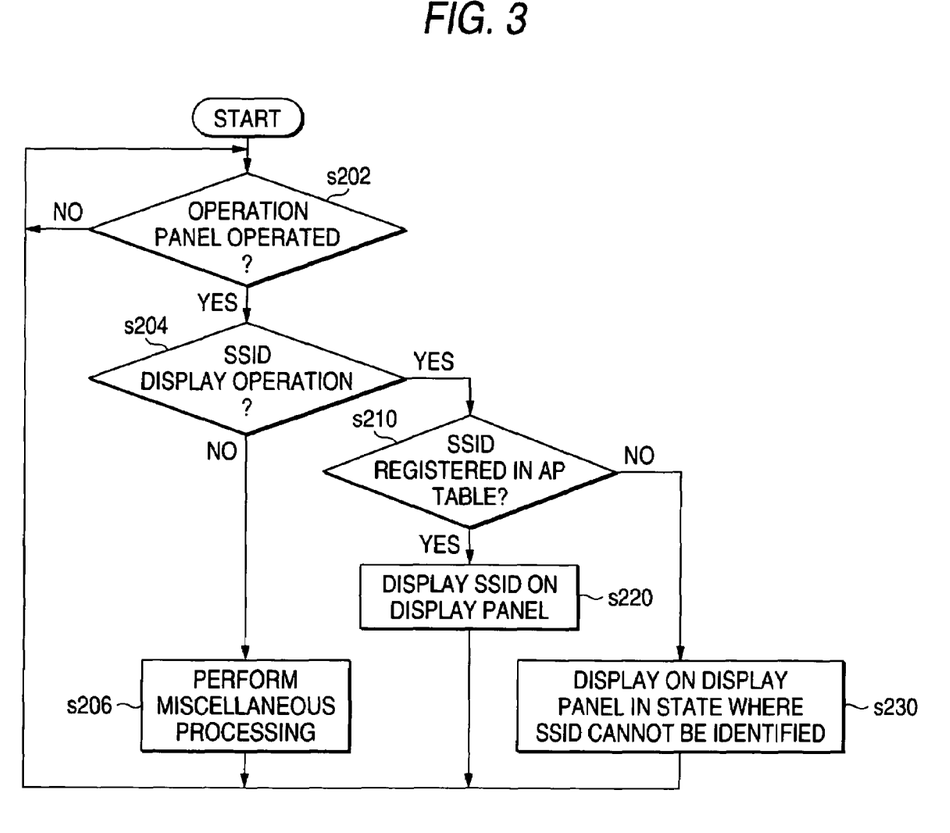
FIG. 3 is a flowchart to show a processing procedure of operation processing in the first embodiment of the invention.

In the embodiment, when the printer 20 receives command data to display the SSID assigned to the access point 10 for relaying data communications on the display panel 27 through the wireless LAN controller 24 or the PC interface section 25, if the SSID commanded in the command data is displayed on the display panel 27, the operation processing in FIG. 3 may also be executed when such command data is received.

According to the configuration, in the operation processing in FIG. 3, when the printer 20 receives external command data, if the SSID commanded in the command data is the SSID of the access point 10 set to use of the SSID secret function (s210), a character string, etc., is displayed on the display panel 27 in a state in which the SSID cannot be identified (s230). Accordingly, the SSID assigned to the access point 10 for relaying data communications can be prevented from being displayed on the display panel 27 as it is, namely, can be prevented from being known.

In the embodiment, if the SSID assigned to any access point 10 other than the access point 10 for relaying data communications by the printer 20 is recorded in the RAM 23 and the user can operate the operation panel 27 to display the SSID on the display panel 27, the operation processing (FIG. 3) may also be started when the user operates the operation panel 27 to display the SSID. In this case, the expression "the SSID assigned to the access point 10 for relaying data communications" is replaced with "the SSID recorded in the RAM 23."

In the embodiment, if the SSID assigned to any access point 10 other than the access point 10 for relaying data communications by the printer 20 is recorded and the SSID is requested in an SNMP request command, the SNMP agent processing (FIG. 4) may also be started when the SNMP request command is received. In this case, the expression "the SSID assigned to the access point 10 for relaying data communications" is replaced with "the SSID requested in the SNMP request command."

In the embodiment, the table registration processing in FIG. 2, FIG. 5 is repeatedly executed every given time (every time period) by way of example. However, the table registration processing may be executed each time the user operates the operation panel 26 in a specific manner or each time a specific command signal is received from the outside of the printer 20.

[Component Correspondence in the Invention]

In the embodiments, the printer 20 functions as a radio station. In the printer 20, the display panel 27 functions as a display section, the operation panel 26 functions as an operation section, and the RAM 23 functions as a record section.

The SSID functions as connection data, the SNMP request command functions as request data, and the beacon signal and probe response function as setting data. In the embodiments, setting information as to whether or not the access point is set to use of the SSID secret function, namely, whether or not the SSID is sent to the surroundings is determined according to whether or not the SSID is included in the beacon signal and the probe response.

Step S140 in FIG. 2 functions as a setting information acquisition section, and step s170 functions as a record command section.

Figure 4:
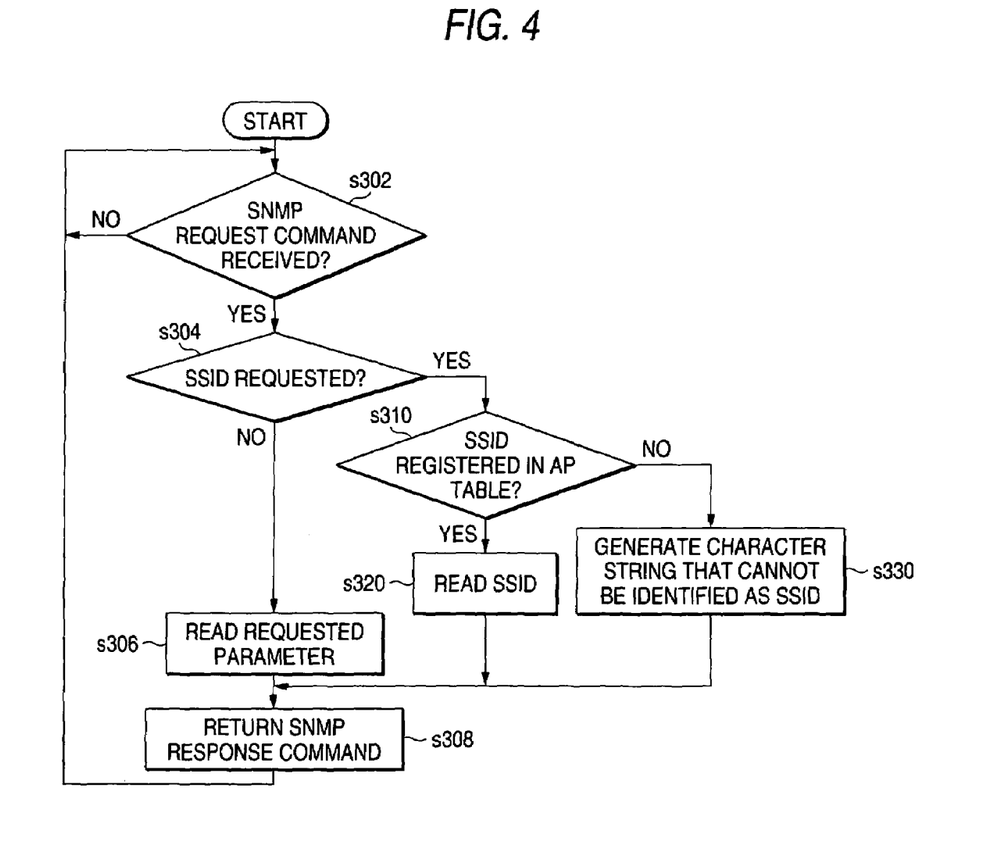
FIG. 4 is a flowchart to show a processing procedure of SNMP agent processing in the first embodiment of the invention.

Step S210 in FIG. 3 and step s310 in FIG. 4 function as a determination section, and steps s230 and s330 function as an output prevention section.

Step S142 in FIG. 5 functions as the setting information acquisition section, and step s170 functions as the record command section.

When the radio station receives request data requesting the connection data of a specific access point from the outside, a technique of transmitting the request data to the radio station is available as a technique for the "malicious user" to know the connection data if the radio station returns the requested connection data.

In the radio station, when the radio station receives request data for requiring the connection data, the output prevention section prevents the connection data of the access point from being transmitted to a source of transmitting the request data if the determination section determines that the access point is set so as not to output the connection data.

In the output prevention method, when the radio station receives request data for requiring the connection data, the connection data of the access point is prevented from being transmitted to a source of transmitting the request data if the access point is determined to be set so as not to output the connection data.

Therefore, when the radio station receives the request data requesting the connection data of a specific access point from the outside, the connection data is not returned in response to the request data if the specific access point is set so as not to output the connection data. As a result, the connection data can be prevented from being known.

The output prevention section and the output prevention step may prevent the connection data from being transmitted by suppressing transmitting a part or all of the connection data or transmitting the connection data in a state in which a part or all of the connection data cannot be identified, for example.

When the radio station receives the command data for displaying the connection data set or acquired in conducting radio communications with a specific access point on a display section, a technique of transmitting the command data for displaying the connection data on the display section is available as a technique for the malicious user to know the connection data if the connection data commanded in the command data is displayed on the display section.

In the radio station, when the radio station receives instruction data for instructing to display the connection data on a display section, the output prevention section prevents the connection data of the access point from being displayed on the display section if the determination section determines that the access point is set so as not to output the connection data.

In the output prevention method, when the radio station receives instruction data for instructing to display the connection data on a display section, the connection data of the access point is prevented from being displayed on the display section if the access point is determined to be set so as not to output the connection data.

Therefore, when the radio station receives the command data for displaying the connection data set or acquired in conducting radio communications with a specific access point on the display section, the connection data is not displayed on the display section if the connection data commanded in the command data is that of the access point set so as not to output the connection data. As a result, the connection data can be prevented from being known.

When the user operates the operation section of the radio station to display the connection data set or acquired in conducting radio communications with a specific access point, a technique of operating the operation section to display the connection data is available as a technique for the malicious user to know the connection data if the connection data corresponding to the operation is displayed on the display section.

The radio station has an operation section to operate the radio station, wherein when a user of the radio station operates the operation section to display the connection data on a display section, the output prevention section prevents the connection data of the access point from being displayed on the display section if the determination section determines that the access point is set so as not to output the connection data.

In the output prevention method, when a user of the radio station operates the operation section to display the connection data on a display section, the connection data of the access point is prevented from being displayed on the display section if the access point is determined to be set so as not to output the connection data.

Therefore, when the user operates at the radio station the operation section to display the connection data set or acquired in conducting radio communications with a specific access point, the connection data is not displayed on the display section if the specific access point is set so as not to output the connection data. As a result, the connection data can be prevented from being known.

The output prevention section and the output prevention step may prevent the connection data from being displayed by suppressing displaying a part or all of the connection data on the display section or displaying the connection data on the display section in a state in which a part or all of the connection data cannot be identified.

In the radio station, the setting information acquisition section acquires the setting information at regular time intervals.

In the output prevention method, the setting information is acquired at regular time intervals.

Therefore, whether or not the access point is set so as to output the connection data can be determined at regular time intervals.

The setting information may be a probe response transmitted in response to a probe request transmitted from the radio station.

The radio station has a storage section that stores the setting information acquired by the setting information acquisition section, wherein the determination section determines whether or not the access point is set so as not to output the connection data based on the setting information stored in the record section.

In the output prevention method, whether or not the access point is set so as not to output the connection data is determined based on the setting information stored in a record section which stores the acquired setting information.

Therefore, the setting information acquired by the setting information acquisition section is recorded in the record section, and whether or not the access point is set so as not to output the connection data can be determined based on the setting information recorded in the record section.

In the radio station, the setting information stored in the storage section is setting information of each access point set so as to output the connection data.

In the output prevention method, the setting information stored in the storage section is setting information of each access point set so as to output the connection data.

Therefore, each access point set so as to output the connection data and the setting information of the access point can be registered in the data table in association with each other based on the setting data transmitted at the predetermined timing from the access point, and whether or not the access point is set so as to output the connection data can be determined based on the data table.

In the radio station, the determination section further determines that an access point whose setting information is not acquired by the setting information acquisition section is an access point set so as not to output the connection data.

In the output prevention methods, an access point whose setting information is not acquired by the setting information acquisition section is determined as an access point set so as not to output the connection data.

Therefore, even if the setting information acquired in the past (previous period) is recorded in the record section, the access point corresponding to the setting information is determined an access point set so as not to output the connection data if the setting information is setting information that cannot be acquired in the most recent period.

Thus, for example, if the access point of the setting information acquired in the past, namely, the access point set so as to output the connection data is changed in the setting so as not to output the connection data, whether or not the access point is set so as not to output the connection data can be determined based on the most recent setting. Accordingly, accidental outputting the connection data as whether or not the access point is set so as not to output the connection data is erroneously determined can be prevented.

Further, if it is made impossible to acquire the setting information from the access point because of trouble in the access point (for example, the access point is placed temporarily out of the reception zone of the electric field or operates unstably), the access point is determined an access point set so as not to output the connection data even if the access point is an access point set so as to output the connection data in the past.

While it is made impossible to acquire the setting information because of trouble in the access point, it is also possible that setting is changed so as not to output the connection data in the access point. Thus, even if such an access point is an access point set so as to output the connection data in the past, it is risky to determine that the access point is determined an access point set so as to output the connection data.

Thus, if it is made impossible to acquire the setting information from the access point because of trouble in the access point, the access point can be determined the access point set so as not to output the connection data, which is suited for preventing accidental outputting the connection data.

In the radio station, the setting information acquisition section further receives setting data transmitted from an access point whose setting information is already stored in the storage section, and tries to acquire second setting information determined according to the setting data, and the determination section determines that the access point is an access point set so as not to output the connection data if the setting information acquisition section fails to acquire the second setting information.

Further, the radio station has a setting information invalidation section that invalidates the setting information stored in the storage section before the setting information acquisition section tries to acquire the second setting information.

In the output prevention method, the setting data transmitted from an access point whose setting information is already stored in the storage section is received, and a second setting information determined according to the setting data is tried to acquire, and the access point is determined as an access point set so as not to output the connection data if the setting information acquisition section fails to acquire the second setting information.

Further, in the output prevention method, the setting information stored in the storage section is invalidated before trying to acquire the second setting information.

Therefore, in starting to acquire the second setting information, the setting information acquired in the past (previous period) is invalidated and newly acquired second setting information only is recorded.

Thus, for example, if the access point of the setting information acquired in the past, namely, the access point set so as to output the connection data is changed in the setting so as not to output the connection data, only the setting information complying with the most recent setting can be recorded. Accordingly, accidental outputting the connection data as whether or not the access point is set so as not to output the connection data is erroneously determined can be prevented.

Further, if it is made impossible to acquire the setting information from the access point because of trouble in the access point, even if the access point is an access point set so as to output the connection data in the past, the access point can be determined an access point set so as not to output the connection data.

What is claimed is:

1. A radio station, which conducts radio communications with an access point comprising a part of a wireless LAN and which communicates with other devices through the access point, the radio station comprising:
    a parameter recording section that records connection data of the access point for conducting radio communications;
    a setting information acquisition section that acquires setting information indicating whether the access point is set to prevent communication of the recorded connection data;
    a determination section that determines whether the access point is set to prevent communication of the recorded connection data based on the setting information acquired by the setting information acquisition section; and
    an output prevention section that prevents a part or all of the recorded connection data of the access point from being outputted to the outside of the radio station if the determination section determines that the access point is set to prevent communication of the recorded connection data.

2. The radio station according to claim 1,
    wherein, when the radio station receives a request for the recorded connection data of the access point, the output prevention section prevents the recorded connection data of the access point from being transmitted in response to the request if the determination section determines that the access point is set to prevent communication of the recorded connection data of the access point.

3. The radio station according to claim 1,
    wherein, when the radio station receives an instruction to display the recorded connection data of an access point on a display section, the output prevention section prevents the recorded connection data of the access point from being displayed on the display section if the determination section determines that the access point is set to prevent communication of the recorded connection data.

4. The radio station according to claim 1, further comprising:
    a display section which displays data; and
    an operation section which controls operation of the radio station,
    wherein, when the operation section is operated to display the recorded connection data on the display section of the radio station, the output prevention section prevents the recorded connection data of the access point from being displayed on the display section if the determination section determines that the access point is set to prevent communication of the recorded connection data.

5. The radio station according to claim 1,
    wherein the setting information acquisition section acquires the setting information at regular time intervals.

6. The radio station according to claim 1,
    wherein the setting information is a probe response transmitted in response to a probe request from the radio station.

7. The radio station according to claim 1, further comprising:
    a storage section that stores the setting information acquired by the setting information acquisition section, wherein the determination section determines whether the access point is set to prevent communication of the recorded connection data based on the setting information stored in the storage section.

8. The radio station according to claim 7, wherein the setting information stored in the storage section is setting information of each access point set to prevent communication of the recorded connection data.

9. The radio station according to claim 1, wherein the determination section further determines that an access point whose setting information is not acquired by the setting information acquisition section is an access point set to prevent communication of the recorded connection data.

10. The radio station according to claim 7, wherein the setting information acquisition section further receives setting data transmitted from an access point whose setting information is already stored in the storage section, and tries to acquire second setting information determined according to the setting data, and wherein the determination section determines that the access point is an access point set to prevent communication of the recorded connection data if the setting information acquisition section fails to acquire the second setting information.

11. The radio station according to claim 10, further comprising:
a setting information invalidation section that invalidates the setting information stored in the storage section before the setting information acquisition section tries to acquire the second setting information.

12. An output prevention method for preventing a radio station, which conducts radio communications with an access point comprising a part of a wireless LAN and which communicates with other devices through the access point, from outputting from the radio station at least a part of connection data used to conduct radio communications with the access point, the method comprising:
recording the connection data;
acquiring setting information indicating whether the access point is set to prevent communication of the recorded connection data;
determining whether the access point is set to prevent communication of the recorded connection data based on the acquired setting information; and
preventing a part or all of the recorded connection data of the access point from being outputted from the radio station if the access point is determined to be set to prevent communication of the recorded connection data.

13. A radio station which conducts radio communications with an access point and communicates with other devices through the access point, the radio station comprising:
a parameter recording section that records parameter data including a connection data indicating settings for the radio station to conduct radio communications with the access point;
a data receiving section that receives first data and second data transmitted from the access point, the first data including the connection data, the second data not including the connection data;
a determination section that determines which one of the first data and the second data the data receiving section receives;
an output section that outputs the parameter data recorded in the parameter recording section;
a command receiving section that receives a request command to output the parameter data from the output section; and
an output prevention section that performs an output control of the connection data from the output section based on a result of the determination section.

14. The radio station according to claim 13, wherein the output prevention section controls the output section to prevent the connection data from being outputted when the determination section determines that the data receiving section receives the second data.

15. The radio station according to claim 13, wherein the output prevention section controls the output section to output the connection data only when the determination section determines that the data receiving section receives the first data.

16. The radio station according to claim 13, further comprising:
an access point recording section that records the connection data when the determination section determines that the data receiving section receives the first data,
wherein the output prevention section controls the output section to output the connection data stored in the access point recording section.

17. The radio station according to claim 13, wherein the output section outputs the parameter data to an information processing apparatus conducting communications with the radio station through the access point, and
wherein the command receiving section receives the request command to output the parameter data recorded in the parameter recording section from the information processing apparatus.

18. The radio station according to claim 13, wherein the output section outputs the parameter data to a display to display the parameter data, and
wherein the command receiving section receives the request command to display the parameter data recorded in the parameter recording section from an information processing apparatus conducting communications with the radio station through the access point.

19. The radio station according to claim 13, further comprising:
an operation section to which a user can input a command,
wherein the output section outputs the parameter data to a display to display the parameter data, and
wherein the command receiving section receives the request command to display the parameter data recorded in the parameter recording section from the operation section.

20. The radio station according to claim 16, wherein:
the access point transmits either the first data or the second data at a predetermined timing;
the data receiving section receives either the first data or the second data transmitted from the access point;
the determination section determines which one of the first data and the second data the data receiving section receives; and
when the determination section determines that the data receiving section receives the first data, the access point recording section records the connection data included in the received first data.

21. A radio station that conducts wireless communications with an access point and communicates with other devices through the access point, the radio station comprising:
a receiving section that receives a parameter data for communicating with the access point, from the access point;

a determination section that, when the receiving section does not receive the parameter data from which an identifying data for identifying the access point is recognizable for a threshold time period, determines that the access point is set to prevent output of the identifying data; and an outputting section that outputs information indicating that the access point is set to prevent output of the identifying data in response to a request for outputting the identifying data, when the determination section determines that the access point is set to prevent output of the identifying data.

22. The radio station according to claim 21, further comprising:

a transmitting section that transmits a request for the parameter data to the access point, wherein the access point transmits the parameter data to the radio station in response to the request for the parameter data.

23. The radio station according to claim 21, further comprising:

a storage unit; and a registering unit that, when the receiving section receives the parameter data from which the identifying data is recognizable, registers the identifying data to the storage unit, wherein the determination section determines, in response to the request for outputting the identifying data, if the access point is set to prevent output of the identifying data when the storage unit does not store the identifying data.

* * * * *